(12) United States Patent
Wen et al.

(10) Patent No.: US 12,085,819 B1
(45) Date of Patent: Sep. 10, 2024

(54) DISPLAY MODULE, DRIVING METHOD, AND DISPLAY DEVICE

(71) Applicant: HKC CORPORATION LIMITED, Shenzhen (CN)

(72) Inventors: Huayin Wen, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 18/619,212

(22) Filed: Mar. 28, 2024

(30) Foreign Application Priority Data

Apr. 3, 2023 (CN) .......................... 202310383800.5

(51) Int. Cl.
| | |
|---|---|
| G02F 1/1347 | (2006.01) |
| G02F 1/133 | (2006.01) |
| G02F 1/13357 | (2006.01) |
| G02F 1/1343 | (2006.01) |
| G02F 1/137 | (2006.01) |

(52) U.S. Cl.
CPC ........ *G02F 1/1347* (2013.01); *G02F 1/13306* (2013.01); *G02F 1/133617* (2013.01); *G02F 1/134309* (2013.01); *G02F 1/13706* (2021.01); *G02F 1/13712* (2021.01)

(58) Field of Classification Search
None
See application file for complete search history.

(56) References Cited

U.S. PATENT DOCUMENTS

| | | | | |
|---|---|---|---|---|
| 2005/0174529 A1* | 8/2005 | Fukushima | ........... | G02F 1/1323 349/197 |
| 2012/0019733 A1* | 1/2012 | Kim | ...................... | H04N 13/359 349/200 |
| 2013/0021329 A1* | 1/2013 | Sakamoto | .............. | G02B 30/27 345/419 |
| 2013/0088526 A1* | 4/2013 | Koito | ...................... | G02B 30/31 345/102 |
| 2013/0258711 A1* | 10/2013 | Okuyama | ............. | G02F 1/1334 362/611 |
| 2014/0085568 A1* | 3/2014 | Li | ........................ | G02F 1/13476 349/86 |
| 2014/0104518 A1* | 4/2014 | Saitou | .................... | G02B 30/27 349/15 |

(Continued)

FOREIGN PATENT DOCUMENTS

CN 107490891 A * 12/2017

*Primary Examiner* — Ryan Crockett

(57) ABSTRACT

A display module, a driving method and a display device are disclosed. The display module includes a light valve regulator, which includes a first regulating electrode layer, a light regulating layer, a second regulating electrode layer, and a light converting layer. The first regulating electrode layer is arranged on a side of the second polarizer facing away from the display panel. The light regulating layer is arranged on a side of the first regulating electrode layer facing away from the second polarizer. The light regulating layer includes a first liquid crystal layer and a second liquid crystal layer alternately arranged. The second regulating electrode layer is arranged on a side of the light regulating layer facing away from the first regulating electrode layer. The light converting layer is arranged on a side of the second regulating electrode layer facing away from the light regulating layer.

10 Claims, 5 Drawing Sheets

(56) References Cited

U.S. PATENT DOCUMENTS

| | | | | |
|---|---|---|---|---|
| 2017/0277012 A1* | 9/2017 | Huh | ........................ | G02F 1/29 |
| 2021/0302790 A1* | 9/2021 | Li | ...................... | G02F 1/13439 |
| 2021/0333578 A1* | 10/2021 | Chen | ................ | G02F 1/133738 |
| 2024/0019725 A1* | 1/2024 | He | ..................... | G02F 1/13345 |
| 2024/0027799 A1* | 1/2024 | Wu | .................. | G02F 1/134309 |

* cited by examiner

DISPLAY MODULE, DRIVING METHOD, AND DISPLAY DEVICE

CROSS-REFERENCE TO RELATED APPLICATIONS

This application claims the priority and benefit of Chinese patent application 202310383800.5, titled "Display Module, Driving Method, and Display Device" and filed Apr. 3, 2023 with China National Intellectual Property Administration, the entire contents of which are incorporated herein by reference.

TECHNICAL FIELD

This application relates to the field of display technology, and more particularly relates to a display module, a driving method, and a display device.

BACKGROUND

The description provided in this section is intended for the mere purpose of providing background information related to the present application but doesn't necessarily constitute prior art.

With the continuous development of display technology, the viewing angle of the display panel is getting wider and wider. The viewing angle of a current display panel is adjacent to 180 degrees, and users can watch the content displayed on the display panel from various angles, basically realizing a viewing experience without dead angles. However, in public places, due to the increased viewing angle, it also brings unnecessary troubles to the user's privacy leakage.

At present, in order to avoid the leakage of privacy, an anti-peeping film may be added to the display screen to achieve the convergence of the viewing angle. However, while effectively preventing peeping, it also brings about the problems of decreased brightness of the display panel and poor display effect. Moreover, the anti-peeping film is only capable of one-way anti-peeping. When the user needs to share the displayed content with other users, it is impossible to switch from the anti-peeping mode back to the normal mode, which reduces the user experience.

SUMMARY

In view of the above, it is therefore a purpose of this application to provide a display module, a driving method, and a display device. By setting a light regulating layer, the display module may be switched between the anti-peeping mode and the wide viewing angle mode, so as to meet the user's needs and improve the user's use experience.

The present application discloses a display module, including a display panel, a backlight module, a first polarizer and a second polarizer. A light emitting surface of the backlight module is disposed adjacent to a light incident surface of the display panel. The first polarizer is arranged on the side of the display panel facing away from the backlight module. The second polarizer is arranged on the side of the display panel adjacent to the backlight module. The display module further includes a light valve regulator, and the light valve regulator is arranged between the light emitting surface of the backlight module and the light incident surface of the display panel. The light valve regulator includes a first regulating electrode layer, a light regulating layer, a second regulating electrode layer and a light converting layer. The first regulating electrode layer is disposed on the side of the second polarizer facing away from the display panel. The light regulating layer is disposed on the side of the first regulating electrode layer away from the second polarizer. The light regulating layer includes a first liquid crystal layer and a second liquid crystal layer arranged alternately. The second regulating electrode layer is disposed on the side of the light regulating layer facing away from the first regulating electrode layer. The first regulating electrode layer and the second regulating electrode layer form an electric field for controlling the first liquid crystal layer and the second liquid crystal layer. The light converting layer is disposed on the side of the second regulating electrode layer away from the light regulating layer. The light converting layer includes a transparent layer and a third polarizer arranged alternately, and the position of the third polarizer overlaps that of the second liquid crystal layer. When the display module is in an anti-peeping mode, the first regulating electrode layer and the second regulating electrode layer are not energized, and only the light located in the first liquid crystal layer can pass through the second polarizer and enter the display panel. When the display module is in the wide viewing angle mode, the first regulating electrode layer and the second regulating electrode layer are energized, and both the light in the first liquid crystal layer and the second liquid crystal layer can pass through the second polarizer and enter the display panel.

In some embodiments, the first liquid crystal layer includes a transparent substrate. A groove is provided in the transparent substrate. A groove wall of the groove is arc-shaped. The transparent substrate includes refraction molecules and first liquid crystal molecules, and the refraction molecules and the first liquid crystal molecules are arranged alternately in sequence. When the display module is in the anti-peeping mode, light directly passes through the refraction molecules and the first liquid crystal molecule. When the display module is in the wide viewing angle mode, light incident on the refraction molecules and the first liquid crystal molecule is scattered.

In some embodiments, an absorption axis of the first polarizer is 90°, an absorption axis of the second polarizer is 0°, and an absorption axis of the third polarizer is 90°.

In some embodiments, the second liquid crystal layer includes a second liquid crystal molecule. Both the first liquid crystal molecule and the second liquid crystal molecule are negative liquid crystal molecules. An initial angle of the first liquid crystal molecule is 90°. An initial angle of the second liquid crystal molecule is 90°. When the first liquid crystal molecule is at an initial angle, a refractive index of the first liquid crystal molecule is the same as a refractive index of the refraction molecules.

In some embodiments, the second liquid crystal layer is provided with a second liquid crystal molecule. The first liquid crystal molecule is a positive liquid crystal, and the second liquid crystal molecule is a negative liquid crystal. An initial angle of the first liquid crystal molecule is 90°, and an initial angle of the second liquid crystal molecule is 90°. When the first liquid crystal molecule is at an initial angle, the refractive index of the first liquid crystal molecule is the same as the refractive index of the refraction molecules.

In some embodiments, the display module further includes an electric field shielding layer disposed between the first liquid crystal layer and the second liquid crystal layer. The first regulating electrode layer includes a first shielding layer, a first electrode and a first viewing angle control electrode. The first shielding layer is disposed between the first electrode and the first viewing angle control electrode. The first electrode is disposed corresponding to the first liquid crystal layer, the first viewing angle control electrode is disposed corresponding to the second liquid crystal layer, and the first shielding layer is disposed corresponding to the electric field shielding layer. The second regulating electrode layer includes a second shielding layer, a second electrode and a second viewing angle control electrode. The second shielding layer is disposed between the second electrode and the second viewing angle control electrode. The second electrode is disposed corresponding to the first liquid crystal layer, the second viewing angle control electrode is disposed corresponding to the second liquid crystal layer, and the second shielding layer is disposed corresponding to the electric field shielding layer. The first electrode and the second electrode are energized to form an electric field to control the rotation of the liquid crystal in the first liquid crystal layer. The second viewing angle control electrode and the first viewing angle control electrode are energized to form an electric field to control rotation of the liquid crystal in the second liquid crystal layer.

In some embodiments, when the first regulating electrode layer and the second regulating electrode layer are energized, the first liquid crystal molecule rotates between 90° and 0°, and the second liquid crystal molecule rotates between 90° and 0°.

In some embodiments, the width of the first liquid crystal layer is a, the width of the second liquid crystal layer is b, and a is greater than or equal to 3b.

The present application further discloses a driving method, which is applied to the above-mentioned display module, the driving method including:
- in the anti-peeping mode, applying no electric field between the first regulating electrode layer and the second regulating electrode layer, so that the liquid crystal molecules in the first liquid crystal layer and the liquid crystal molecules in the second liquid crystal layer lie at an initial angle;
- in the wide viewing angle mode, applying an electric field with a set intensity between the first regulating electrode layer and the second regulating electrode layer, so that the liquid crystal molecules in the first liquid crystal layer and the liquid crystal molecules in the second liquid crystal layer form a set angle;
- wherein when the display module is in the anti-peeping mode, the first regulating electrode layer and the second regulating electrode layer are not energized, the liquid crystal molecules in the first liquid crystal layer and the second liquid crystal layer are in an initial state, and the light emitted by the backlight module is partially injected into the display panel after passing through the light valve regulator; when the display module is in the wide viewing angle mode, the first regulating electrode layer and the second regulating electrode layer are energized, the liquid crystal molecules in the first liquid crystal layer and the second liquid crystal layer are rotated, and all the light emitted by the backlight module enters the display panel after passing through the light valve regulator.

The present application further discloses a display device, which includes a drive circuit and the above-mentioned display module, where the drive circuit drives the display module.

In the display module of this application, the energization of the first regulating electrode layer and the second regulating electrode layer in the light valve regulator is controlled to control the rotation of the liquid crystal of the first liquid crystal layer and the second liquid crystal layer in the light valve regulator so as to adjust the range of the area where light is emitted from the light valve regulator, so that the display module may be switched between the anti-peep mode and the wide viewing angle mode, so that users can switch between the anti-peep mode and the wide viewing angle mode according to their own viewing needs, so as to meet the user's use demand and provide the user's use experience.

BRIEF DESCRIPTION OF DRAWINGS

The accompanying drawings are used to provide a further understanding of the embodiments according to the present application, and constitute a part of the specification. They are used to illustrate the embodiments according to the present application, and explain the principle of the present application in conjunction with the text description. Apparently, the drawings in the following description merely represent some embodiments of the present disclosure, and for those having ordinary skill in the art, other drawings may also be obtained based on these drawings without investing creative efforts. A brief description of the accompanying drawings is provided as follows.

Figure 1:
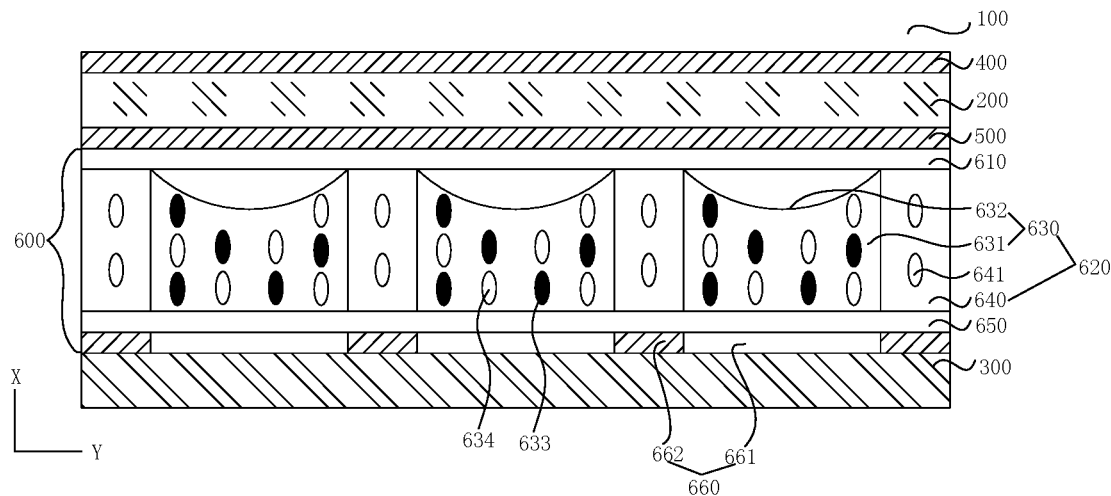
FIG. 1 is a schematic diagram of a display module according to a first embodiment of the present application.

In the drawings: 100, display module; 200, display panel; 300, backlight module; 400, first polarizer; 500, second polarizer; 600, light valve regulator; 610, first regulating electrode layer; 611, first shielding layer; 612, first electrode; 613, first viewing angle control electrode; 620, light regulating layer; 630, first liquid crystal layer; 631, transparent substrate; 632, groove; 633, refraction molecule; 634, first liquid crystal molecule; 640, second liquid crystal layer; 641, second liquid crystal molecule; 650, second regulating electrode layer; 651, second shielding layer; 652, second electrode; 653, second viewing angle control electrode; 660, light converting layer; 661, transparent layer; 662, third polarizer; 670, electric field shielding layer; 700, drive circuit; 800, display device.

DETAILED DESCRIPTION OF EMBODIMENTS

It should be understood that the terms used herein, the specific structures and function details disclosed herein are intended for the mere purposes of describing specific embodiments and are representative. However, this application may be implemented in many alternative forms and should not be construed as being limited to the embodiments set forth herein.

As used herein, terms "first", "second", or the like are merely used for illustrative purposes, and shall not be construed as indicating relative importance or implicitly indicating the number of technical features specified. Thus, unless otherwise specified, the features defined by "first" and "second" may explicitly or implicitly include one or more of such features. Terms "multiple", "a plurality of", and the like mean two or more. Term "comprising", "including", and any variants thereof mean non-exclusive inclusion, so that one or more other features, integers, steps, operations, units, components, and/or combinations thereof may be present or added.

In addition, terms "center", "transverse", "up", "down", "left", "right", "vertical", "horizontal", "top", "bottom", "inside", "outside", or the like are used to indicate orientational or relative positional relationships based on those illustrated in the drawings. They are merely intended for simplifying the description of the present disclosure, rather than indicating or implying that the device or element referred to must have a particular orientation or be constructed and operate in a particular orientation. Therefore, these terms are not to be construed as restricting the present disclosure.

Furthermore, as used herein, terms "installed on", "mounted on", "connected to", "coupled to", "connected with", and "coupled with" should be understood in a broad sense unless otherwise specified and defined. For example, they may indicate a fixed connection, a detachable connection, or an integral connection. They may denote a mechanical connection, or an electrical connection. They may denote a direct connection, a connection through an intermediate, or an internal connection between two elements. For those of ordinary skill in the art, the specific meanings of the above terms as used in the present application may be understood depending on specific contexts.

The present application will be described in detail below with reference to the accompanying drawings and optional embodiments. It should be noted that, should no conflict is present, the various embodiments or technical features described below may be combined arbitrarily to form new embodiments.

Figure 2:
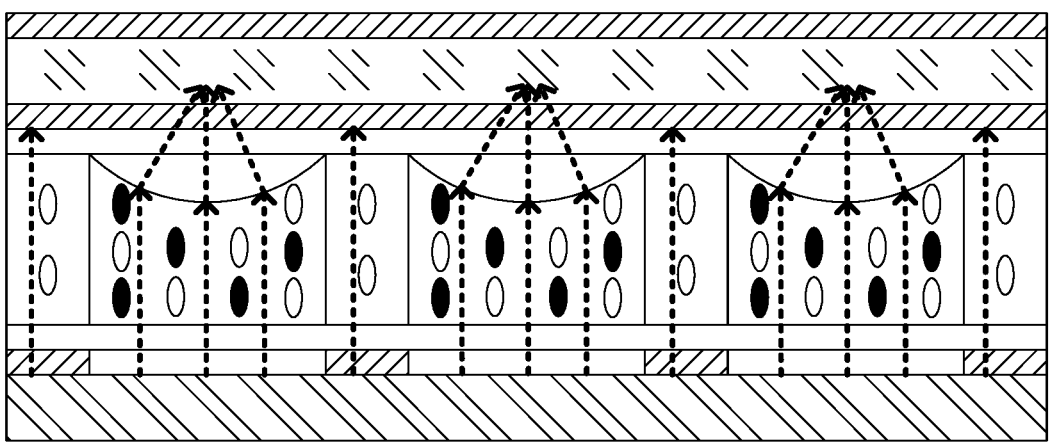
FIG. 2 is a schematic diagram of a light path of the display module in an anti-peeping mode according to the first embodiment of the present application.
Figure 3:
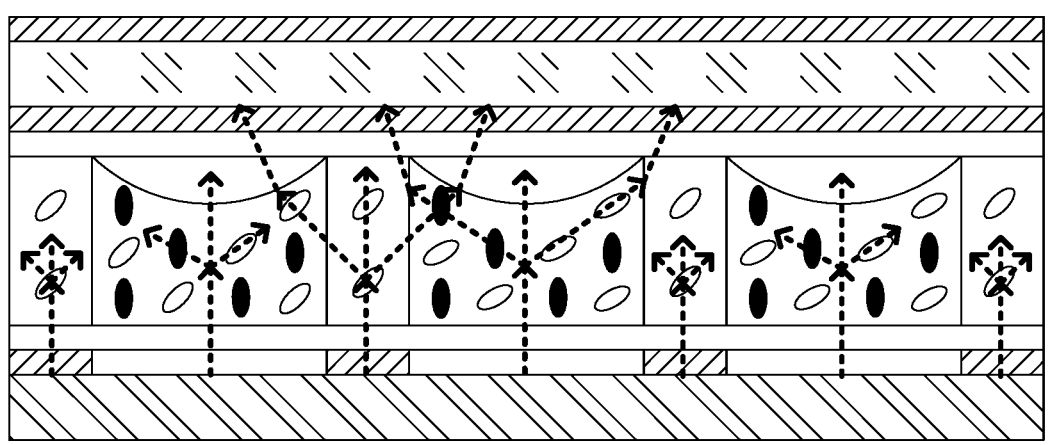
FIG. 3 is a schematic diagram of a light path of the display module in a wide viewing angle mode according to the first embodiment of the present application.

As shown in FIGS. 1 to 3, as a first embodiment of the present application, a display module 100 is disclosed and includes a display panel 200, a backlight module 300, a first polarizer 400, and a second polarizer 500. A light emitting surface of the backlight module 300 is disposed adjacent to a light incident surface of the display panel 200. The first polarizer 400 is disposed on a side of the display panel 200 facing away from the backlight module 300. The second polarizer 500 is disposed on a side of the display panel 200 adjacent to the backlight module 300. The display module 100 further includes a light valve regulator 600, which is disposed between a light emitting surface of the backlight module 300 and the light incident surface of the display panel 200. The light valve regulator 600 includes a first regulating electrode layer 610, a light regulating layer 620, a second regulating electrode layer 650 and a light converting layer 660. The first regulating electrode layer 610 is disposed on the side of the second polarizer 500 facing away from the display panel 200. The light regulating layer 620 is disposed on the side of the first regulating electrode layer 610 facing away from the second polarizer 500. The light regulating layer 620 includes a first liquid crystal layer 630 and a second liquid crystal layer 640 which are spaced apart from each other. The second regulating electrode layer 650 is disposed on a side of the light regulating layer 620 facing away from the first regulating electrode layer 610. The first regulating electrode layer 610 and the second regulating electrode layer 650 form an electric field for controlling the first liquid crystal layer 630 and the second liquid crystal layer 640. The light converting layer 660 is disposed on the side of the second regulating electrode layer 650 facing away from the light regulating layer 620. The light converting layer 660 includes a transparent layer 661 and a third polarizer 662 arranged alternately. The position of the third polarizer 662 overlaps the position of the second liquid crystal layer 640. When the display module 100 is in the anti-peeping mode, the first regulating electrode layer 610 and the second regulating electrode layer 650 are not energized. The light does not change the light path after passing through the first liquid crystal layer 630 and the second liquid crystal layer 640. Light in the first liquid crystal layer 630 passes through the second polarizer 500 to enter the display panel 200, and light in the second liquid crystal layer 640 cannot pass through the second polarizer 500. When the display module 100 is in the wide viewing angle mode, the first regulating electrode layer 610 and the second regulating electrode layer 650 are energized. When the light passes through the first liquid crystal layer 630 and the second liquid crystal layer 640, the light path changes, so that the light located in the first liquid crystal layer 630 and the second liquid crystal layer 640 can both pass through the second polarizer 500 and enter the display panel 200. The transparent layer 661 may be a glass layer, or may be made of other transparent materials, which are not limited here, and the designer can choose a design according to the actual situation.

In use, when the display module 100 is required to be in the anti-peeping mode, the first regulating electrode layer 610 and the second regulating electrode layer 650 are not energized, so that no electric field is formed between the first regulating electrode layer 610 and the second regulating electrode layer 650, and the liquid crystal molecules in the first liquid crystal layer 630 and the second liquid crystal layer 640 of the light regulating layer 620 maintain the initial state, and the light emitted from the backlight module 300 passes through the light converting layer 660 and enters the first liquid crystal layer 630 and the second liquid crystal layer 640. At this time, the light passing through the transparent layer 661 would not change the polarization angle of the light, and the light passing through the transparent layer 661 will directly enter the first liquid crystal layer 630. When the light continues to pass through the first liquid crystal layer 630, the polarization angle of the light will also not be changed, so that the light can directly pass through the second polarizer 500 and enter the display panel 200. Under the action of the third polarizer 662, the polarization angle of the light that passes through the third polarizer 662 will change, and the light that passes through the third polarizer 662 will continue to pass through the second liquid crystal layer 640. At this time, when the light passes through the second liquid crystal layer 640, the polarization angle of the light will remain unchanged, and the light will still maintain the changed polarization angle when passing through the third polarizer 662, so that the light cannot pass through the second polarizer 500 to enter the display panel 200. At this time, the position corresponding to the second liquid crystal layer 640 in the display panel 200 presents an opaque dark state, and at the position corresponding to the first liquid crystal layer 630 in the display panel 200 light keeps incident, so that the light incident into the display panel 200 is arranged alternately, thereby forming an anti-peeping mode, whereby the user can only watch the display content at the viewing angle where the light-incident surface of the display panel 200 is vertical, and cannot watch the display content at other viewing angles.

When the display module 100 needs to be in a wide viewing angle mode, the first regulating electrode layer 610 and the second regulating electrode layer 650 are energized, and an electric field is formed between the first regulating electrode layer 610 and the second regulating electrode layer 650, so that the liquid crystal molecules in the first liquid crystal layer 630 and the liquid crystal molecules in the second liquid crystal layer 640 are rotated to a preset angle. The rotation angle is related to the strength of the electric field. The light passes through the transparent layer 661 and directly enters the first liquid crystal layer 630. Under the action of the liquid crystal in the first liquid crystal layer 630, the light refracts and the exiting angle of the light changes, so that the light is scattered when passing through the first liquid crystal layer 630 to enter the display panel 200 through the second polarizer 500. When the light passes through the third polarizer 662, the polarization angle of the light changes under the action of the third polarizer 662, and then enters the second liquid crystal layer 640. Due to the rotation of the liquid crystal in the second liquid crystal layer 640, the light will be refracted when passing through the second liquid crystal layer 640, and the exiting angle of the light will change, so that the light is scattered when passing through the second liquid crystal layer 640 to enter the display panel 200 through the second polarizer 500. At this time, the position of the display panel 200 corresponding to the first liquid crystal layer 630 and the position corresponding to the second liquid crystal layer 640 keep the light incident, so that each position of the display panel 200 can receive light, thereby forming a wide viewing angle mode, and users can watch the displayed content from various angles without affecting viewing the content.

The display module 100 of this embodiment may control whether the first regulating electrode layer 610 and the second regulating electrode layer 650 in the light valve regulator 600 are energized or not, in order to control the rotation of the liquid crystal of the first liquid crystal layer 630 and the second liquid crystal layer 640 in the light valve regulator 600, so as to adjust the range of the area in the light valve regulator 600 through which light may be emitted and pass, thus realizing the switching of the display module 100 between the anti-peep mode and the wide viewing angle mode, so that users can switch between the anti-peep mode and the wide viewing angle mode according to their own viewing needs, thus meeting the needs of users and provide users with a better experience. It should be noted that an electric field with a preset strength may be applied between the first regulating electrode layer 610 and the second regulating electrode layer 650, and the strength of the electric field corresponds to the rotation angle of the liquid crystal, and the rotation angle of the liquid crystal may be adjusted by adjusting the strength of the electric field, so that the display module 100 assumes a set viewing angle to realize the adjustment of the viewing angle.

In order to make the anti-peep effect of the display panel 200 more obvious when the display module 100 is switched to the anti-peep mode, as shown in FIG. 1, the first liquid crystal layer 630 includes a transparent substrate 631. The transparent substrate 631 defines a groove 632. A groove wall of the groove 632 is arc-shaped. The transparent substrate 631 includes a refraction molecule 633 and a first liquid crystal molecule 634. The refraction molecule 633 and the first liquid crystal molecule 634 are sequentially arranged alternately. When the display module 100 is in the anti-peeping mode, light directly passes through the refraction molecule 633 and the first liquid crystal molecule 634. When the display module 100 is in the wide viewing angle mode, the light incident on the refraction molecule 633 and the first liquid crystal layer 630 is scattered. When the first liquid crystal molecule 634 is at an initial angle, the refractive index of the first liquid crystal molecule 634 is the same as that of the refraction molecule 633.

When the display module 100 is in the anti-peeping mode, the first regulating electrode layer 610 and the second adjusting motor layer are not energized on, and the liquid crystal molecules in the first liquid crystal layer 630 and the second liquid crystal layer 640 are in the initial state. The light incident on the first liquid crystal layer 630 will directly pass through the refraction molecule 633 and the first liquid crystal molecule 634, and converge on the groove wall of the groove 632 of the transparent substrate 631. Since the groove wall of the groove 632 is arc-shaped, the light incident on the groove wall of the groove 632 will be focused on the central axis of the groove 632 adjacent to the transparent substrate 631, and then incident on the display panel 200, so that the light intensity of the position of the display panel 200 corresponding to the first liquid crystal layer 630 is greater than the light intensity of the position of the display panel 200 corresponding to the second liquid crystal layer 640, so as to achieve a narrower viewing angle range and higher visible brightness within the viewing angle range, and the anti-peeping mode of the display panel 200 is more obvious.

When the display module 100 is in the wide viewing angle mode, the first regulating electrode layer 610 and the second regulating electrode layer 650 are energized, and an electric field with a set intensity is generated between the first regulating electrode layer 610 and the second regulating electrode layer 650, so that both the first liquid crystal molecule 634 of the first liquid crystal layer 630 and the liquid crystal of the second liquid crystal layer 640 are rotated. The light incident on the first liquid crystal layer 630 will be scattered when it touches the first liquid crystal molecule 634 and the refraction molecules 633, and there will be light incident vertically on the groove wall of the groove 632 of the transparent substrate 631 and light incident obliquely thereon. The vertically incident light will be focused by the groove wall of the groove 632 of the transparent substrate 631 and then exit the first liquid crystal layer 630 and enter the display panel 200 through the second polarizer 500. The obliquely incident light will be reflected and refracted by the transparent substrate 631 before exiting, so that the light will be scattered when entering the first liquid crystal layer 630 to exit the first liquid crystal layer 630, and then pass through the second polarizer 500 and enter the display panel 200. When the light incident on the second liquid crystal layer 640 touches the liquid crystal in the second liquid crystal layer 640, the light will be refracted under the action of the liquid crystal in the second liquid crystal layer 640. The exiting angle of the light changes, so that the light is scattered when passing through the second liquid crystal layer 640 to pass through the second polarizer 500 and enter the display panel 200, thereby realizing a wide viewing angle range. Moreover, since the light is scattered when passing through the first liquid crystal layer 630 and the second liquid crystal layer 640, the light entering the display panel 200 will be relatively uniform, thereby forming a wide viewing angle mode, and users can watch the displayed content from various angles without affecting the viewing experience. In this embodiment, the transparent substrate 631 may be a glass substrate, and the glass substrate may be a high-refractive glass transparent substrate, and the glass refractive index of the glass substrate may be between 1.9 and 2.1. The refraction molecule 633 may be a liquid polymer material such as homogeneous liquid transparent silicone rubber or liquid transparent polyimide, and its refractive index should be the same as that of the first liquid crystal molecule 634 along the long axis and different from the short axis.

Further, the absorption axis of the first polarizer 400 is 90°, the absorption axis of the second polarizer 500 is 0°, and the absorption axis of the third polarizer 662 is 90°. The second liquid crystal layer 640 includes a second liquid crystal molecule 641. Both the first liquid crystal molecule 634 and the second liquid crystal molecule 641 are negative liquid crystal molecules. The initial angle of the first liquid crystal molecule 634 is 90°, and the initial angle of the second liquid crystal molecule 641 is 90°. The initial angle of the first liquid crystal molecule 634 and the initial angle of the second liquid crystal molecule 641 are realized by the alignment film. The alignment film is made of polyimide (Polyimide, PI) alignment film. When the first liquid crystal molecule 634 is at the initial angle, the refractive index of the first liquid crystal molecule 634 is the same as that of the refraction molecule 633. Certainly, the first liquid crystal molecule 634 may also be a positive liquid crystal, and the second liquid crystal molecule 641 may be a negative liquid crystal. The initial angle of the first liquid crystal molecule 634 is 90°, and the initial angle of the second liquid crystal molecule 641 is 90°. When the first liquid crystal molecule 634 is at an initial angle, the refractive index of the first liquid crystal molecule 634 is the same as that of the refraction molecule 633. In use, when the first regulating electrode layer 610 and the second regulating electrode layer 650 are energized, the first liquid crystal molecule 634 rotates to between 90° and 0°, and the second liquid crystal molecule 641 rotates to between 90° and 0°. The optimum angle of the first liquid crystal molecule 634 is 0°, and the optimum angle of the second liquid crystal molecule 641 is 45°. It should be noted that, when the first liquid crystal molecule 634 and the second liquid crystal molecule 641 are in the wide viewing angle mode, they can also be rotated to other angles, and the designer can select and design according to the actual situation, and details will not be described here. The second liquid crystal layer 640 may be designed as a vertical alignment (VA) display structure.

Specifically, as shown in FIG. 2, when the display panel 200 is in the anti-peeping mode, the first regulating electrode layer 610 and the second regulating electrode layer 650 are not energized, and no electric field will be formed between the first regulating electrode layer 610 and the second regulating electrode layer 650, the first liquid crystal molecule 634 in the first liquid crystal layer 630 and the second liquid crystal molecule 641 in the second liquid crystal layer 640 maintain the initial angle. When the light from the backlight module 300 enters, the light will first pass through the light converting layer 660. The light passing through the third polarizer 662 of the light converting layer 660 will be converted into polarized light of a corresponding angle by the third polarizer 662 and then continue to enter the second liquid crystal layer 640, that is, converted into 0° polarized light and then enter the second liquid crystal layer 640. The light passing through the transparent layer 661 of the light converting layer 660 will directly enter the first liquid crystal layer 630 without changing the polarization angle of the light. Since the first liquid crystal molecule 634 of the first liquid crystal layer 630 and the second liquid crystal molecule 641 of the second liquid crystal layer 640 maintain the initial angle, the light entering the second liquid crystal layer 640 and the light entering the first liquid crystal layer 630 will not change polarization angle of light. Since the polarization angle of the light incident on the second liquid crystal layer 640 has not changed, the absorption axis of the second polarizer 500 is 0°, so that the light located in the second liquid crystal layer 640 cannot exit the second polarizer 500. In contrast, the light incident on the first liquid crystal layer 630 converges on the groove wall of the groove 632 of the transparent substrate 631. Since the groove wall of the groove 632 is arc-shaped, the light incident on the groove wall of the groove 632 will be focused, and will be focused on the central axis of the groove 632 adjacent to the transparent substrate 631 and then exit the second polarizer 500 to enter the display panel 200. At this time, the brightness of the position of the display panel 200 corresponding to the second liquid crystal layer 640 is smaller than the brightness of the position of the display panel 200 corresponding to the first liquid crystal layer 630, and the position of the display panel 200 corresponding to the second liquid crystal layer 640 is displayed in a dark state, so that the display module 100 presents a narrow viewing angle range. Furthermore, under the action of the transparent substrate 631, although the display module 100 presents a narrow viewing angle range, the display brightness within the viewing angle range is better.

As shown in FIG. 3, when the display panel 200 is in the wide viewing angle mode, the first regulating electrode layer 610 and the second regulating electrode layer 650 are energized, and an electric field with a set intensity is formed between the first regulating electrode layer 610 and the second regulating electrode layer 650. The first liquid crystal molecule 634 of the first liquid crystal layer 630 and the second liquid crystal molecule 641 of the second liquid crystal layer 640 are rotated to a preset angle. In this embodiment, they are both rotated to 45°. When the light from the backlight module 300 enters, the light will first pass through the light converting layer 660. The light passing through the third polarizer 662 of the light converting layer 660 will be converted into polarized light of a corresponding angle by the third polarizer 662 and then continue to enter the second liquid crystal layer 640, that is, converted into 0° polarized light and then enter the second liquid crystal layer 640 . . . . After entering the second liquid crystal layer 640, under the action of the second liquid crystal molecule 641, the light will be refracted to form scattering, and then enter the adjacent first liquid crystal layer 630 or pass through the second polarizer 500 to enter the display panel 200. The light passing through the transparent layer 661 of the light converting layer 660 will directly enter the first liquid crystal layer 630. After entering the first liquid crystal layer 630, under the action of the first liquid crystal molecule 634 and the refraction molecule 633, the light will be refracted to form scattering, and will be incident on the adjacent second liquid crystal layer 640 or the groove wall of the groove 632 of the transparent substrate 631. The light incident on the groove wall of the groove 632 will be focused and then exit the second polarizer 500 to enter the display panel 200, thereby achieving a wide viewing angle range. Moreover, since the light is scattered when passing through the first liquid crystal layer 630 and the second liquid crystal layer 640, the light entering the display panel 200 will be relatively uniform. It should be noted that, the first liquid crystal molecule 634 of the first liquid crystal layer 630 and the second liquid crystal molecule 641 of the second liquid crystal layer 640 may both be rotated to 0°.

In this embodiment, the width of the first liquid crystal layer 630 is a, the width of the second liquid crystal layer 640 is b, where a is greater than or equal to 3b. That is, the width of the second liquid crystal layer 640 is approximately equal to one-third of the width of the first liquid crystal layer 630, so that the display module 100 can obtain a narrower viewing angle when it is in the anti-peeping mode. Of course, the designer can also choose the design according to the actual situation, and there is no limitation here. It should be noted that, the width direction of the first liquid crystal layer 630 referred to herein is the Y-axis direction as shown in FIG. 1.

Figure 4:
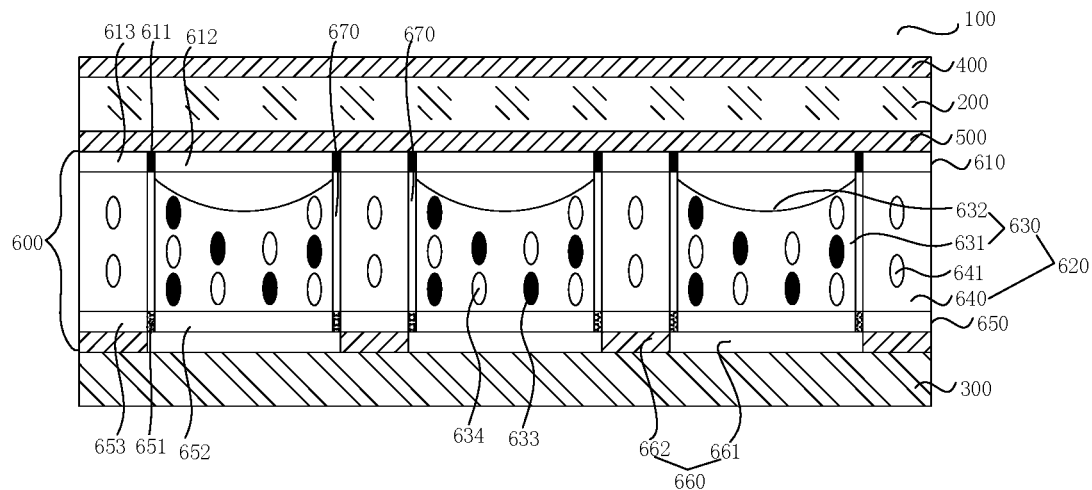
FIG. 4 is a schematic diagram of a display module according to a second embodiment of the present application.
Figure 5:
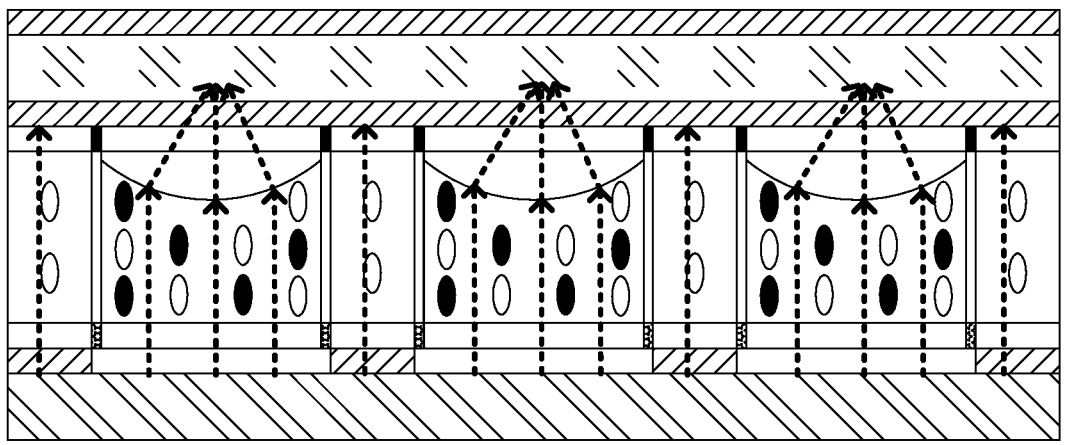
FIG. 5 is a schematic diagram of a light path of the display module in an anti-peeping mode according to the second embodiment of the present application.
Figure 6:
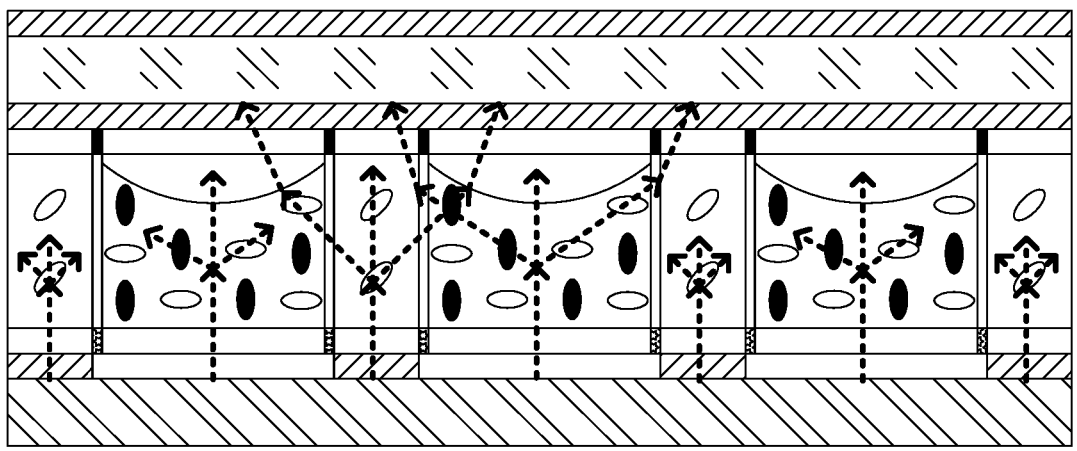
FIG. 6 is a schematic diagram of a light path of the display module in a wide viewing angle mode according to the second embodiment of the present application.

As shown in FIG. 4 to FIG. 6, as the second embodiment of the present application, which is an improvement of the first embodiment of the present application, a display module 100 is disclosed. The display module 100 includes an electric field shielding layer 670. The electric field shielding layer 670 is disposed between the first liquid crystal layer 630 and the second liquid crystal layer 640. The first regulating electrode layer 610 includes a first shielding layer 611, a first electrode 612 and a first viewing angle control electrode 613. The first shielding layer 611 is disposed between the first electrode 612 and the first viewing angle control electrode 613. The first electrode 612 is disposed corresponding to the first liquid crystal layer 630. The first viewing angle control electrode 613 is disposed corresponding to the second liquid crystal layer 640. The first shielding layer 611 is disposed corresponding to the electric field shielding layer 670. The second regulating electrode layer 650 includes a second shielding layer 651, a second electrode 652 and a second viewing angle control electrode 653. The second shielding layer 651 is disposed between the second electrode 652 and the second viewing angle control electrode 653. The second electrode 652 is disposed corresponding to the first liquid crystal layer 630. The second viewing angle control electrode 653 is disposed corresponding to the second liquid crystal layer 640. The second shielding layer 651 is disposed corresponding to the electric field shielding layer 670. The first electrode 612 and the second electrode 652 are energized to form an electric field to control the rotation of the liquid crystal in the first liquid crystal layer 630, and the second viewing angle control electrode 653 and the first viewing angle control electrode 613 are energized to form an electric field to control the rotation of the liquid crystal in the second liquid crystal layer 640. In this embodiment, the optimum rotation angle of the first liquid crystal molecule 634 is 0°, and the optimum rotation angle of the second liquid crystal molecule 641 is 45°; Of course, designers can also control the rotation angles of the first liquid crystal molecule 634 and the second liquid crystal molecule 641 according to the actual situation.

In use, when the display module 100 is in the anti-peeping mode, as shown in FIG. 5, the first regulating electrode layer 610 and the second regulating electrode layer 650 are not energized, and no electric field will be formed between the first regulating electrode layer 610 and the second regulating electrode layer 650. The first liquid crystal molecule 634 in the first liquid crystal layer 630 and the second liquid crystal molecule 641 in the second liquid crystal layer 640 maintain the initial angle. When the light from the backlight module 300 enters, the light will first pass through the light converting layer 660. The light passing through the third polarizer 662 of the light converting layer 660 will be converted into polarized light of a corresponding angle by the third polarizer 662 and then continue to enter the second liquid crystal layer 640, that is, converted into 0° polarized light and then enters the second liquid crystal layer 640. The light passing through the transparent layer 661 of the light converting layer 660 will directly enter the first liquid crystal layer 630 without changing the polarization angle of the light. Since the first liquid crystal molecule 634 of the first liquid crystal layer 630 and the second liquid crystal molecule 641 of the second liquid crystal layer 640 maintain the initial angle, the light entering the second liquid crystal layer 640 and the light entering the first liquid crystal layer 630 will not change polarization angle of light. Since the polarization angle of the light incident on the second liquid crystal layer 640 has not changed, the absorption axis of the second polarizer 500 is 0°, so that the light located in the second liquid crystal layer 640 cannot exit the second polarizer 500. The light incident on the first liquid crystal layer 630 converges on the groove wall of the groove 632 of the transparent substrate 631. Since the groove wall of the groove 632 is arc-shaped, the light incident on the groove wall of the groove 632 will be focused, and will be focused on the central axis of the groove 632 adjacent to the transparent substrate 631 and then exit the second polarizer 500 to enter the display panel 200. At this time, the light intensity of the position of the display panel 200 corresponding to the second liquid crystal layer 640 is smaller than the light intensity of the position of the display panel 200 corresponding to the first liquid crystal layer 630, and the position of the display panel 200 corresponding to the second liquid crystal layer 640 is displayed in a dark state, so that the display module 100 presents a narrow viewing angle range. At the same time, under the action of the transparent substrate 631, although the display module 100 presents a narrow viewing angle range, the display brightness within the viewing angle range is improved.

When the display module 100 is in the wide viewing angle mode, as shown in FIG. 6, the first regulating electrode layer 610 and the second regulating electrode layer 650 are energized, an electric field is formed between the first electrode 612 and the second electrode 652, and an electric field is also formed between the first viewing angle control electrode 613 and the second viewing angle control electrode 653. Under the action of the electric field shielding layer 670, the electric field formed by the first electrode 612 and the second electrode 652 and the electric field formed by the first viewing angle control electrode 613 and the second viewing angle control electrode 653 will not interfere with each other. The first liquid crystal molecule 634 of the first liquid crystal layer 630 and the second liquid crystal molecule 641 of the second liquid crystal layer 640 are rotated to a set angle. When the light from the backlight module 300 enters, the light will first pass through the light converting layer 660. The light passing through the third polarizer 662 of the light converting layer 660 will be converted into polarized light of a corresponding angle by the third polarizer 662 and then continue to enter the second liquid crystal layer 640, that is, converted into 0° polarized light and then enter the second liquid crystal layer 640. After entering the second liquid crystal layer 640, under the action of the second liquid crystal molecule 641, the light will be refracted to form scattering, and then enter the adjacent first liquid crystal layer 630 or pass through the second polarizer 500 to enter the display panel 200. At this time, the scattering angle of light in the second liquid crystal layer 640 may be controlled by the first viewing angle control electrode 613 and the second viewing angle control electrode 653, and the rotation angle of the liquid crystal may be controlled by changing the voltages of the first viewing angle control electrode 613 and the second viewing angle control electrode 653 to change the scattering angle of light, thereby adjusting the width of the viewing angle. The light passing through the transparent layer 661 of the light converting layer 660 will directly enter the first liquid crystal layer 630. After entering the first liquid crystal layer 630, under the action of the first liquid crystal molecule 634 and the refraction molecules 633, the light will be refracted to form scattering, and then enter the adjacent second liquid crystal layer 640 or the groove wall of the groove 632 of the transparent substrate 631. The light incident on the groove wall of the groove 632 will be focused and then exit the second polarizer 500 to enter the display panel 200, thereby achieving a wide viewing angle range. Because the light will be refracted when it enters the liquid crystal, the phase difference of the refracted light along the short axis and the long axis of the liquid crystal is different. Therefore, the smaller the angle between the light and the long axis of the liquid crystal, the lower the brightness, and the smaller the angle between the light and the short axis of the liquid crystal, the higher the brightness, so the first viewing angle control electrode 613 and the second viewing angle control electrode 653 are set to control the electric field intensity by controlling the voltages of the first viewing angle control electrode 613 and the second viewing angle control electrode 653 to change the rotation angle of the second liquid crystal molecule 641 of the second liquid crystal layer 640 to realize the control of the viewing angle range in the wide viewing angle mode. Under the action of the first shielding layer 611 and the second shielding layer 651, the first viewing angle control electrode 613 and the first electrode 612 will not interfere with each other, and the second viewing angle control electrode 653 and the second electrode 652 will not interfere with each other. It should be noted that the first shielding layer 611, the second shielding layer 651 and the electric field shielding layer 670 may be made of transparent shielding materials. In general, the display module 100 of this embodiment can control the voltage of the first viewing angle control electrode 613 and the second viewing angle control electrode 653 in the wide viewing angle mode to control the viewing angle range of the display module 100 in the wide viewing angle mode. The viewing angle range may be controlled and changed only by changing the voltage, so as to realize a wider or narrower wide viewing angle display screen.

Figure 7:
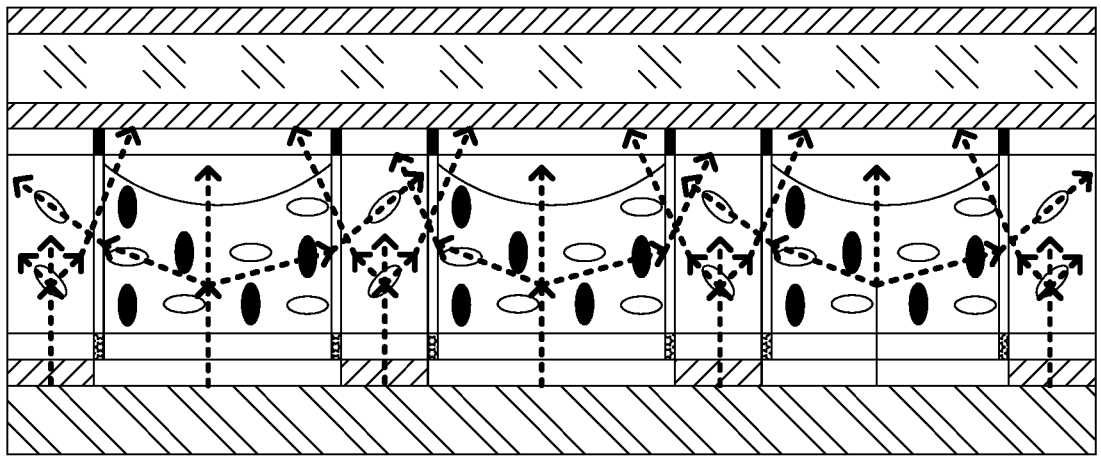
FIG. 7 is a schematic diagram of a light path of the display module in the wide viewing angle mode according to the second embodiment of the present application.
Figure 8:
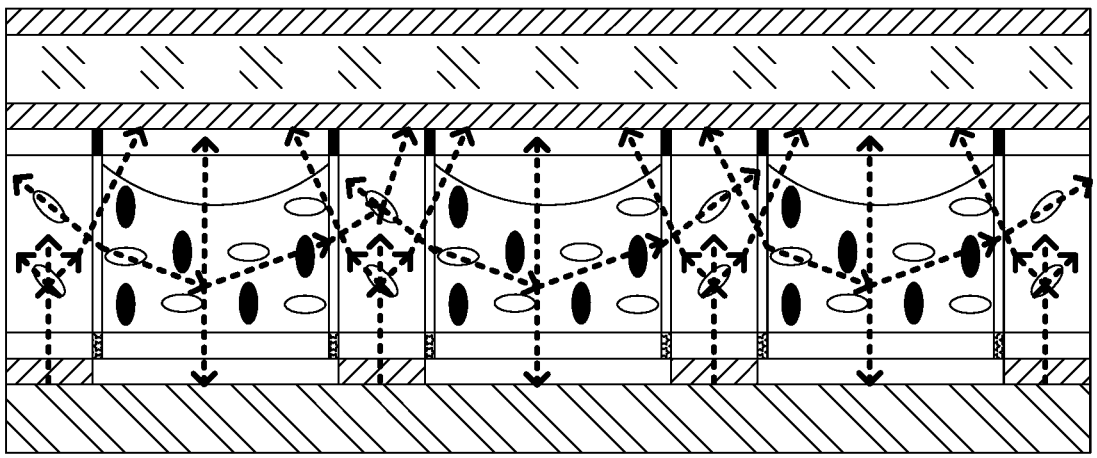
FIG. 8 is a schematic diagram of another light path of the display module in the wide viewing angle mode according to the second embodiment of the present application.
Figure 9:
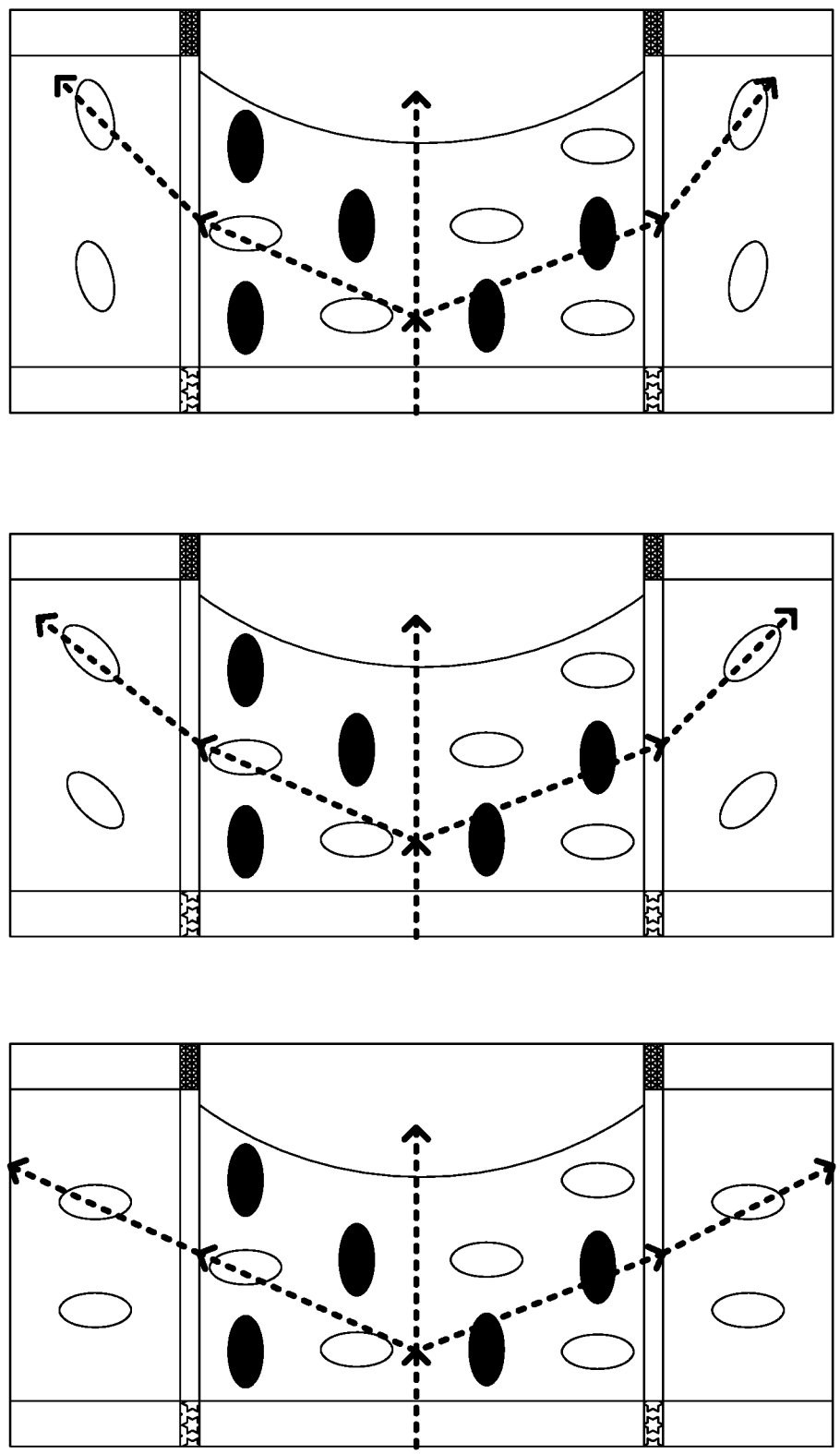
FIG. 9 is a schematic diagram of a relationship between a rotation angle of a second liquid crystal molecule and a viewing angle range of the display module in the second embodiment of the present application.

Further, in order to make the display module 100 display a uniform viewing angle in each region of the display module 100 when the viewing angle range in the wide viewing angle mode is adjusted, the second liquid crystal layer 640 located on both sides of the first liquid crystal layer 630 LCD 641 are arranged symmetrically with each other. That is, as shown in FIG. 7, in this arrangement, the light received by the display panel 200 is relatively uniform, and after being refracted by the second liquid crystal molecules 641 of the second liquid crystal layers 640 located on both sides of the first liquid crystal layer 634, the viewing angle of the light emitted increases. The relationship between the rotation angle of the second liquid crystal molecule 641 and the viewing angle range of the display module 100 is shown in FIG. 9. The closer the rotation angle of the second liquid crystal molecule 641 is to 0°, the larger the viewing angle range of the display module 100 is. Of course, the display module 100 can also be arranged such that the second liquid crystal layer 640 on the left side of the display module 100 and the second liquid crystal layer 640 on the right side of the display module 100 are arranged symmetrically with each other, as shown in FIG. 8, designers can choose designs according to actual needs, but no details would be provided herein. It should be noted that, at this moment, since the rotation angle of the second liquid crystal molecule 641 in the second liquid crystal layer 640 is controlled by the first viewing angle control electrode 613 and the second viewing angle control electrode 653, the rotation angle of the second liquid crystal molecule 641 may be rotated and adjusted between 0°-180° according to actual needs, not limited to 0°-90°.

Figure 10:
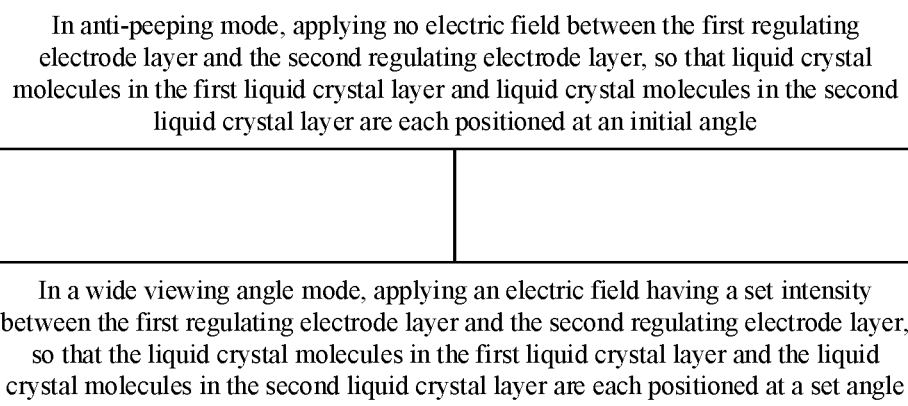
FIG. 10 is a flowchart of a driving method according to a third embodiment of the present application.

As shown in FIG. 10, as a third embodiment of the present application, a driving method is disclosed, the driving method is applied to the above-mentioned display module, and the driving method includes steps:

in the anti-peeping mode, applying no electric field between the first regulating electrode layer and the second regulating electrode layer, so that the liquid crystal molecules in the first liquid crystal layer and the liquid crystal molecules in the second liquid crystal layer lie at an initial angle;

in the wide viewing angle mode, applying an electric field with a set intensity between the first regulating electrode layer and the second regulating electrode layer, so that the liquid crystal molecules in the first liquid crystal layer and the liquid crystal molecules in the second liquid crystal layer form a set angle;

wherein when the display module is in the anti-peeping mode, the first regulating electrode layer and the second regulating electrode layer are not energized, the liquid crystal molecules in the first liquid crystal layer and the second liquid crystal layer are in an initial state, and the light emitted by the backlight module is partially injected into the display panel after passing through the light valve regulator; when the display module is in the wide viewing angle mode, the first regulating electrode layer and the second regulating electrode layer are energized, the liquid crystal molecules in the first liquid crystal layer and the second liquid crystal layer are rotated, and all the light emitted by the backlight module enters the display panel after passing through the light valve regulator.

By controlling the energization of the first regulating electrode layer and the second regulating electrode layer in the light valve regulator to control the rotation of the liquid crystal of the first liquid crystal layer and the second liquid crystal layer in the light valve regulator, thereby adjusting the range of the area that may be emitted by the light in the light valve regulator to realize the switch between the anti-peep mode and the wide viewing angle mode of the display module, so that the user can switch between the anti-peep mode and the wide viewing angle mode according to his own viewing needs, so as to meet the user's use needs and improve the user's use experience.

Figure 11:
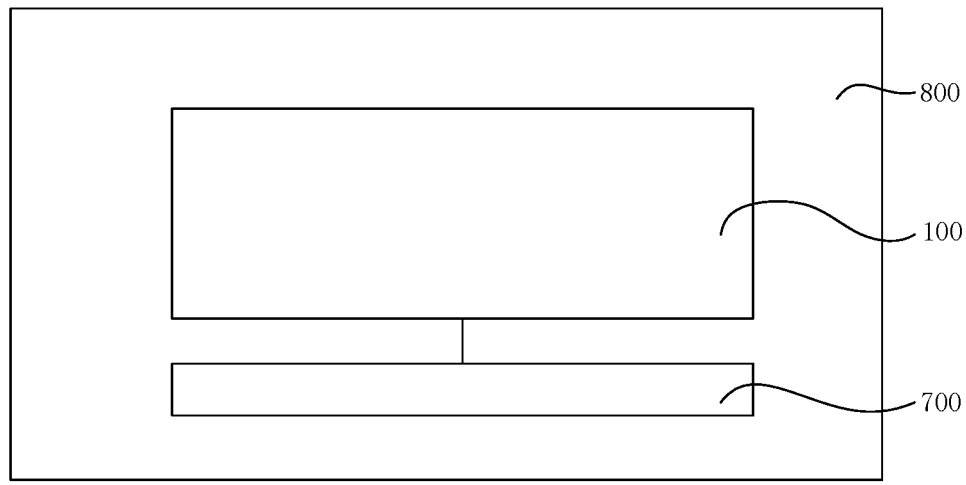
FIG. 11 is a schematic diagram of a display device according to a fourth embodiment of the present application.

As shown in FIG. 11, as a fourth embodiment of the present application, a display device 800 is disclosed. The display device 800 includes a drive circuit 700 and the display module 100 as described above. The drive circuit 700 drives the display module 100. The display device 800 of this embodiment control the rotation of the liquid crystal of the first liquid crystal layer 630 and the second liquid crystal layer 640 in the light valve regulator 600 by controlling whether the first regulating electrode layer 610 and the second regulating electrode layer 650 are energized or not, so as to adjust the range of the area that may be emitted by light in the light valve regulator 600, so as to realize the switching of the display module 100 between the anti-peep mode and the wide viewing angle mode, so that users can switch between the anti-peeping mode and the wide viewing angle mode according to the user's own viewing needs, so as to meet the user's use demand and improve the user's use experience.

It should be noted that the limitations of various operations involved in this solution will not be deemed to limit the order of the operations, provided that they do not affect the implementation of the specific solution, so that the operations written earlier may be executed earlier or they may also be executed later or even at the same time. As long as the solution may be implemented, they should all be regarded as falling in the scope of protection of this application.

The technical solutions of the present application may be widely used in various display panels, such as TN (Twisted Nematic) display panels, IPS (In-Plane Switching) display panels, VA (Vertical Alignment) display panels, and MVA (Multi-Domain Vertical Alignment) display panels. Of course, other types of display panels, such as OLED (Organic Light-Emitting Diode) display panels, may also be applicable to the above solutions.

It should be noted that the inventive concept of the present application may be formed into many embodiments, but the length of the application document is limited and so these embodiments cannot be enumerated one by one. The technical features may be arbitrarily combined to form a new embodiment, and the original technical effect may be enhanced after the various embodiments or technical features are combined.

The foregoing description is merely a further detailed description of the present application made with reference to some specific illustrative embodiments, and the specific implementations of the present application will not be construed to be limited to these illustrative embodiments. For those having ordinary skill in the technical field to which this application pertains, numerous simple deductions or substitutions may be made without departing from the concept of this application, which shall all be regarded as falling in the scope of protection of this application.

What is claimed is:

1. A display module, comprising a display panel, a backlight module, a first polarizer, and a second polarizer; wherein a light emitting surface of the backlight module is disposed adjacent to a light incident surface of the display panel, wherein the first polarizer is arranged on a side of the display panel facing away from the backlight module, the second polarizer is arranged on a side of the display panel adjacent to the backlight module, wherein the display module further comprises a light valve regulator arranged between the light emitting surface of the backlight module and the light incident surface of the display panel, wherein the light valve regulator comprises:
 a first regulating electrode layer, arranged on a side of the second polarizer facing away from the display panel;
 a light regulating layer, arranged on a side of the first regulating electrode layer facing away from the second polarizer, the light regulating layer comprising a first liquid crystal layer and a second liquid crystal layer that are alternately arranged;
 a second regulating electrode layer, arranged on a side of the light regulating layer facing away from the first regulating electrode layer, wherein the first controlling electrode layer and the second regulating electrode layer are operative to form an electric field used for regulating the first liquid crystal layer and the second liquid crystal layer; and
 a light converting layer, arranged on a side of the second regulating electrode layer facing away from the light regulating layer, the light converting layer comprising a transparent layer and a third polarizer that are alternately arranged, wherein a position of each third polarizer overlaps a position of the respective second liquid crystal layer;
 wherein when the display module is in an anti-peeping mode, the first regulating electrode layer and the second regulating electrode layer are not energized, and only light in the first liquid crystal layer is operative to pass through the second polarizer to enter the display panel; and
 wherein when the display module is in a wide viewing angle mode, the first regulating electrode layer and the second regulating electrode layer are energized, and both light in the first liquid crystal layer and light in the second liquid crystal layer are operative to pass through the second polarizer to enter the display panel.

2. The display module as recited in claim 1, wherein the first liquid crystal layer comprises a transparent substrate, which comprises a groove, wherein a groove wall of the groove is arc-shaped, wherein a refraction molecule and a first liquid crystal molecule are arranged in the transparent substrate, and wherein the refraction molecule and the first liquid crystal molecule are alternately arranged in sequence;
 wherein when the display module is in the anti-peeping mode, light is operative to directly pass through the refracting molecule and the first liquid crystal molecule; and
 wherein when the display module is in the wide viewing angle mode, light incident on the refraction molecule and the first liquid crystal molecule is scattered.

3. The display module as recited in claim 2, wherein a second liquid crystal molecule is arranged in the second liquid crystal layer, wherein both the first liquid crystal molecule and the second liquid crystal molecule are negative liquid crystal molecules, wherein an initial angle of the first liquid crystal molecule is 90°, and an initial angle of the second liquid crystal molecule is 90°;
 wherein when the first liquid crystal molecule is at the initial angle, a refractive index of the first liquid crystal molecule is identical with a refractive index of the refraction molecule.

4. The display module as recited in claim 3, wherein when the first regulating electrode layer and the second regulating electrode layer are energized, the first liquid crystal molecule is operative to rotate in the range between 90° and 0°, and the second liquid crystal molecule is operative to rotate in the range between 90° and 0°.

5. The display module as recited in claim 2, wherein a second liquid crystal molecule is arranged in the second liquid crystal layer, wherein the first liquid crystal molecule is a positive liquid crystal, and the second liquid crystal molecule is a negative liquid crystal, wherein an initial angle of the first liquid crystal molecule is 90°, and an initial angle of the second liquid crystal molecule is 90°;

wherein when the first liquid crystal molecule is at the initial angle, a refractive index of the first liquid crystal molecule is identical with a refractive index of the refraction molecule.

6. The display module as recited in claim 1, wherein an absorption axis of the first polarizer is 90°, an absorption axis of the second polarizer is 0°, and an absorption axis of the third polarizer is 90°.

7. The display module as recited in claim 1, further comprising an electric field shielding layer arranged between the first liquid crystal layer and the second liquid crystal layer;
wherein the first regulating electrode layer comprises a first shielding layer, a first electrode, and a first viewing angle control electrode; wherein the first shielding layer is arranged between the first electrode and the first viewing angle control electrode, wherein the first electrode is arranged corresponding to the first liquid crystal layer, the first viewing angle control electrode is arranged corresponding to the second liquid crystal layer, and the first shielding layer is arranged corresponding to the electric field shielding layer;
wherein the second regulating electrode layer comprises a second shielding layer, a second electrode, and a second viewing angle control electrode; wherein the second shielding layer is arranged between the second electrode and the second viewing angle control electrode, wherein the second electrode is arranged corresponding to the first liquid crystal layer, the second viewing angle control electrode is arranged corresponding to the second liquid crystal layer, and the second shielding layer is arranged corresponding to the electric field shielding layer;
wherein the first electrode and the second electrode are operative to be energized to form an electric field to control rotation of liquid crystal molecules in the first liquid crystal layer; and wherein the second viewing angle control electrode and the first viewing angle control electrode are operative to be energized to form an electric field to control rotation of liquid crystal molecules in the second liquid crystal layer.

8. The display module as recited in claim 1, wherein a width of the first liquid crystal layer is a, a width of the second liquid crystal layer is b, wherein a is greater than or equal to 3b.

9. A driving method applied to a display module, the display module comprising a display panel, a backlight module, a first polarizer, and a second polarizer; wherein a light emitting surface of the backlight module is disposed adjacent to a light incident surface of the display panel, wherein the first polarizer is arranged on a side of the display panel facing away from the backlight module, and the second polarizer is arranged on a side of the display panel adjacent to the backlight module, wherein the display module further comprises a light valve regulator arranged between the light emitting surface of the backlight module and the light incident surface of the display panel; wherein the light valve regulator comprises a first regulating electrode layer, a second regulating electrode layer, and a light converting layer; wherein the first regulating electrode layer is disposed on a side of the second polarizer facing away from the display panel; wherein the light regulating layer is arranged on a side of the first regulating electrode layer facing away from the second polarizer, wherein the light regulating layer comprises a first liquid crystal layer and a second liquid crystal layer that are alternately arranged; wherein the second regulating electrode layer is disposed on a side of the light regulating layer facing away from the first regulating electrode layer, wherein the first regulating electrode layer and the second regulating electrode layer are operative to form an electric field used for controlling the first liquid crystal layer and the second liquid crystal layer; wherein the light converting layer is arranged on a side of the second regulating electrode layer facing away from the light regulating layer; wherein the light converting layer comprises a transparent layer and a third polarizer that are alternately arranged, wherein a position of each third polarizer overlaps a position of the respective second liquid crystal layer, wherein the driving method comprises:
in an anti-peeping mode, applying no electric field between the first regulating electrode layer and the second regulating electrode layer, so that liquid crystal molecules in the first liquid crystal layer and liquid crystal molecules in the second liquid crystal layer are each positioned at an initial angle;
in a wide viewing angle mode, applying an electric field having a set intensity between the first regulating electrode layer and the second regulating electrode layer, so that the liquid crystal molecules in the first liquid crystal layer and the liquid crystal molecules in the second liquid crystal layer are each positioned at a set angle;
wherein when the display module is in the anti-peeping mode, the first regulating electrode layer and the second regulating electrode layer are not energized, and the liquid crystal molecules in the first liquid crystal layer and the second liquid crystal layer are in an initial state, and light emitted by the backlight module is partially transmitted into the display panel after passing through the light valve regulator;
wherein when the display module is in the wide viewing angle mode, the first regulating electrode layer and the second regulating electrode layer are energized, the liquid crystal molecules in the first liquid crystal layer and the second liquid crystal layer are rotated, and the light emitted by the backlight module all enters the display panel after passing through the light valve regulator.

10. A display device, comprising a drive circuit and a display module, the drive circuit being configured to drive the display module, the display module comprising a display panel, a backlight module, a first polarizer, and a second polarizer; wherein a light emitting surface of the backlight module is disposed adjacent to a light incident surface of the display panel, the first polarizer is arranged on a side of the display panel facing away from the backlight module, the second polarizer is arranged on a side of the display panel adjacent to the backlight module, wherein the display module further comprises a light valve regulator arranged between the light emitting surface of the backlight module and the light incident surface of the display panel, wherein the light valve regulator comprises a first regulating electrode layer, a second regulating electrode layer, and a light converting layer; wherein the first regulating electrode layer is disposed on a side of the second polarizer facing away from the display panel; the light regulating layer is arranged on a side of the first regulating electrode layer away from the second polarizer, wherein the light regulating layer comprises a first liquid crystal layer and a second liquid crystal layer that are alternately arranged; the second regulating electrode layer is disposed on a side of the light regulating layer facing away from the first regulating electrode layer, wherein the first regulating electrode layer and the second regulating electrode layer are operative to form an electric field used for controlling the first liquid crystal layer and the second liquid crystal layer; wherein the light converting layer is arranged on a side of the second regulating electrode layer facing away from the light regulating layer, the light converting layer comprising a transparent layer and a third polarizer that are alternately arranged, and wherein a position of each third polarizer overlaps a position of the respective second liquid crystal layer.

* * * * *